Nov. 1, 1966  A. SCHMERMUND ET AL  3,282,401
CONTROL DEVICES FOR AUTOMATIC PACKING MACHINES
Filed Oct. 6, 1964  9 Sheets-Sheet 5

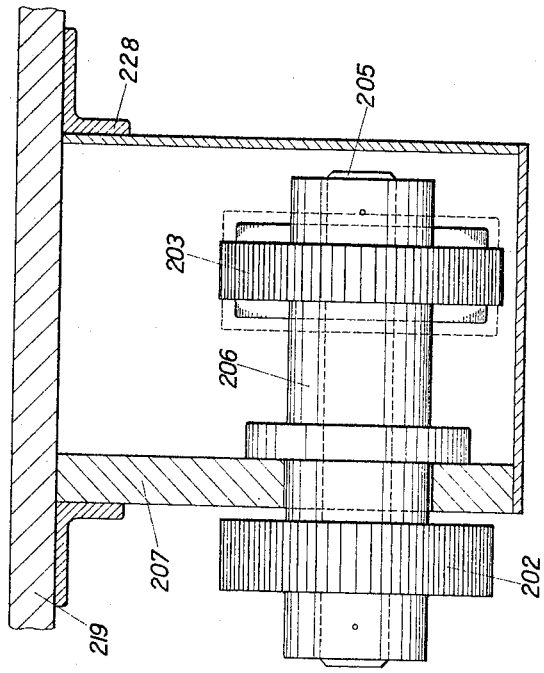
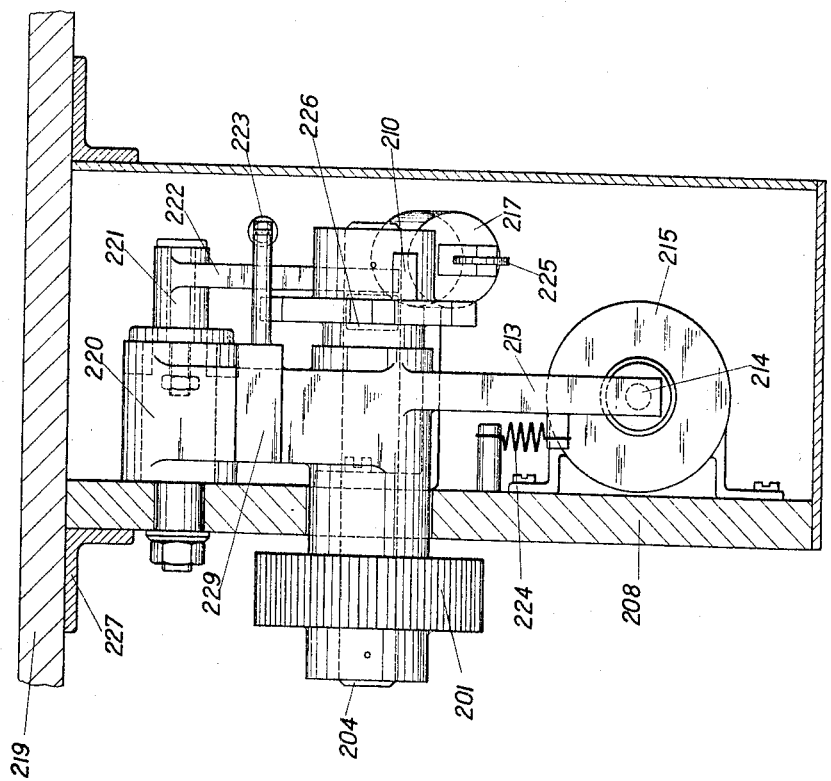

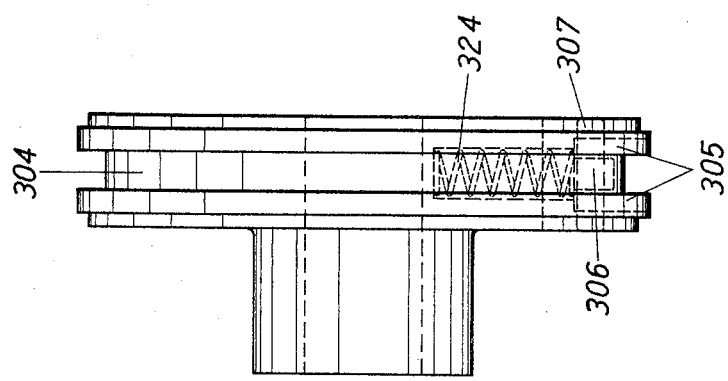
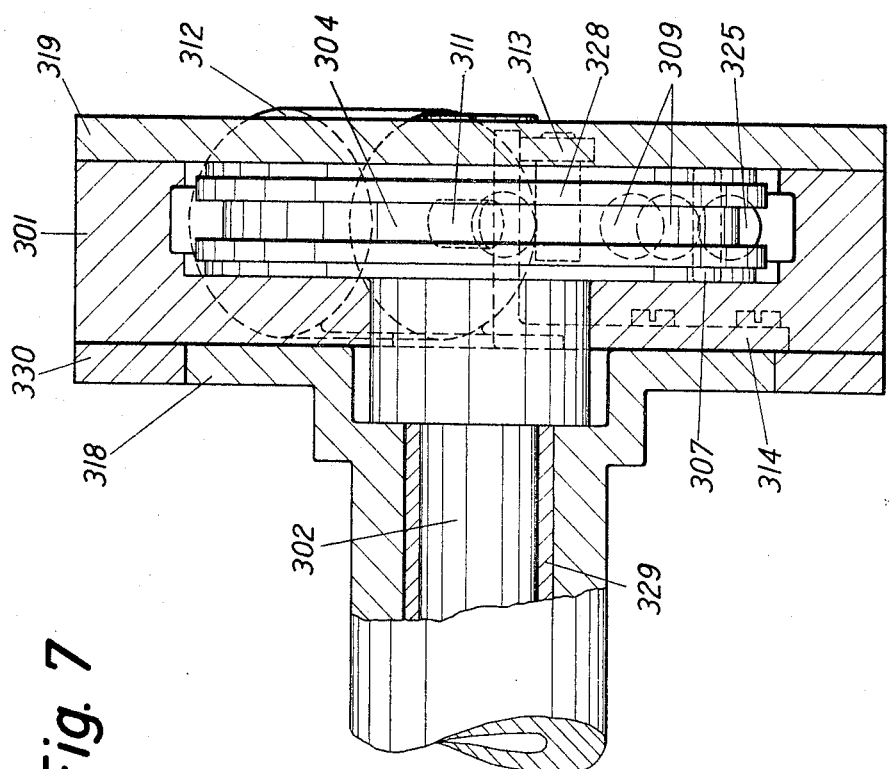

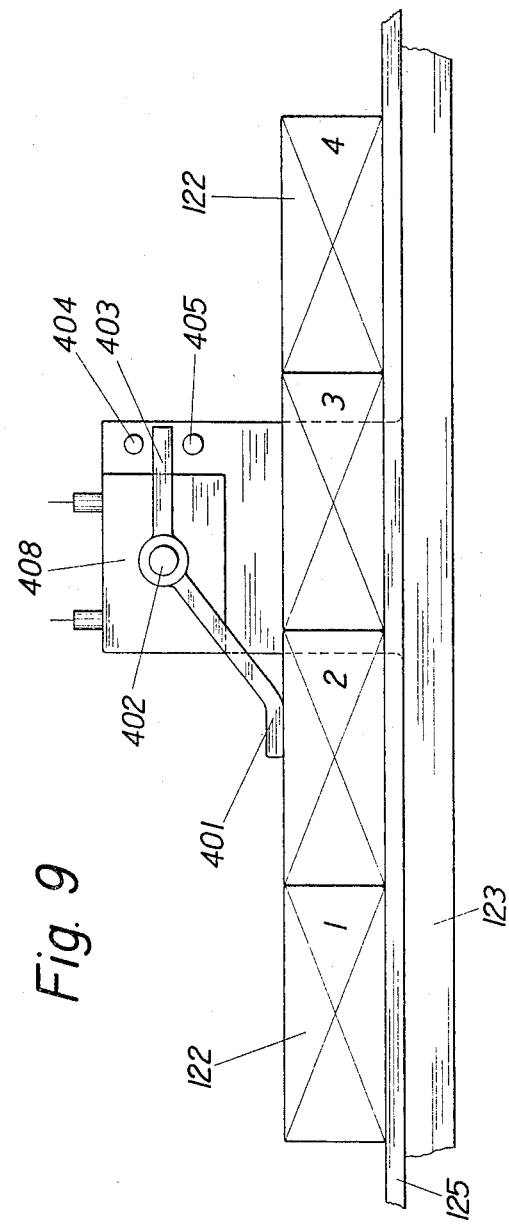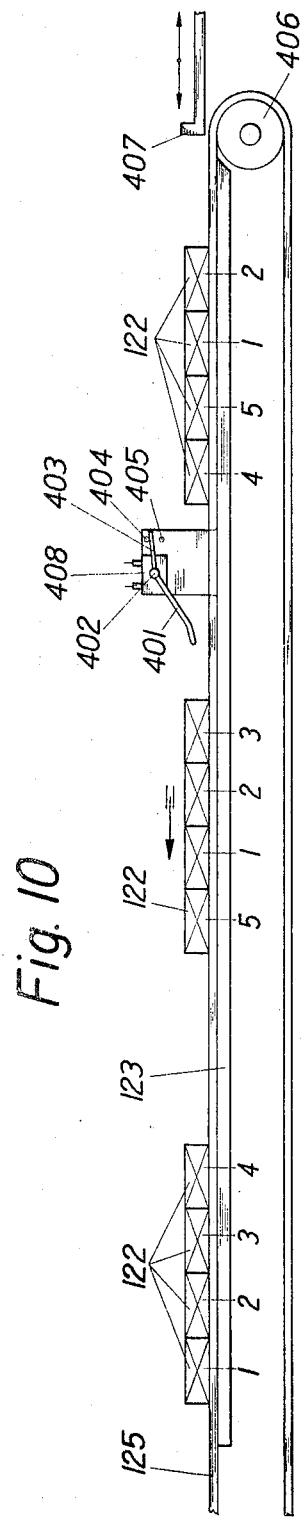

Nov. 1, 1966   A. SCHMERMUND ET AL   3,282,401
CONTROL DEVICES FOR AUTOMATIC PACKING MACHINES
Filed Oct. 6, 1964   9 Sheets-Sheet 8

United States Patent Office 3,282,401
Patented Nov. 1, 1966

3,282,401
CONTROL DEVICES FOR AUTOMATIC
PACKING MACHINES
Alfred Schmermund, 62 Kornerstrasse, Gevelsberg, Westphalia, Germany, and Erich Beermann and Siegfried Knecht, both of Gevelsberg, Westphalia, Germany; said Beermann and said Knecht assignors to said Schmermund
Filed Oct. 6, 1964, Ser. No. 401,867
Claims priority, application Great Britain, Oct. 10, 1963, 39,939/63
9 Claims. (Cl. 198—40)

The invention relates to control devices for automatic packing machines.

Automatic packing machines are known which each have a conveyor member onto which packets formed at an assemblying station or at a plurality of assembling stations (for example at four assembling stations) are discharged for being fed to a packing station at which groups of such packets are jointly packed in a common outer package, often referred to as a "carton." Frequently, and especially in the case of packets of cigarettes, ten packets arranged in two overlying rows each of five packets represent the contents of one carton.

Irregularities in the supply of packets to the packing station may occur, for example one or more of the assembling stations feeding the conveyor member may run emptly or break down. The regularity of supply of packets to the conveyor member governs the number of packets which are available for packing into cartons.

Accordingly, it is an object of the invention to provide an arrangement for controlling a packing machine in such a way that a working cycle is performed at the packing station only when sufficient packets for making up a carton are present on the conveyor.

If a simple counting device is used for counting the packings arriving on the conveyor member and for directly controlling the working cycle at the packing station accordingly, the disadvantage exists that it may happen that a signal, which controls the release of a carton blank and thus the performance of a working cycle at the packing station, arrives too late and causes an idling cycle at the packing station owing to the absence of a carton blank at the required time.

It is another object of the invention to provide a control arrangement for a packing machine which avoids the disadvantage just referred to.

It is a more specific object of the invention to provide a control arrangement comprising a particularly suitable counting device for counting articles fed along a conveyor path in the machine and for controlling an impulse storage device after a predetermined number of articles have been fed along said conveyor path, the storage device being adapted to initiate a working operation of the packing machine.

It is a further specific object of the invention to provide a control arrangement comprising a particularly suitable data storage device.

These and other objects and advantages of the invention will become apparent to those skilled in the art from the following detailed description when read in conjunction with the appended drawings, which are given by way of example and in which:

FIG. 4 is a fragmentary side view of the device of FIG. 3;

FIG. 5 is a further fragmentary side view of the device of FIG. 3;

FIG. 7 is a fragmentary side view of the storage mechanism of FIG. 6;

FIG. 8 is a side view of a rotor of the storage mechanism of FIG. 6;

FIG. 9 is an elevation view of another counting device;

FIG. 10 is a fragmentary view of a conveyor belt, showing the disposition of the device of FIG. 9;

Figure 13:
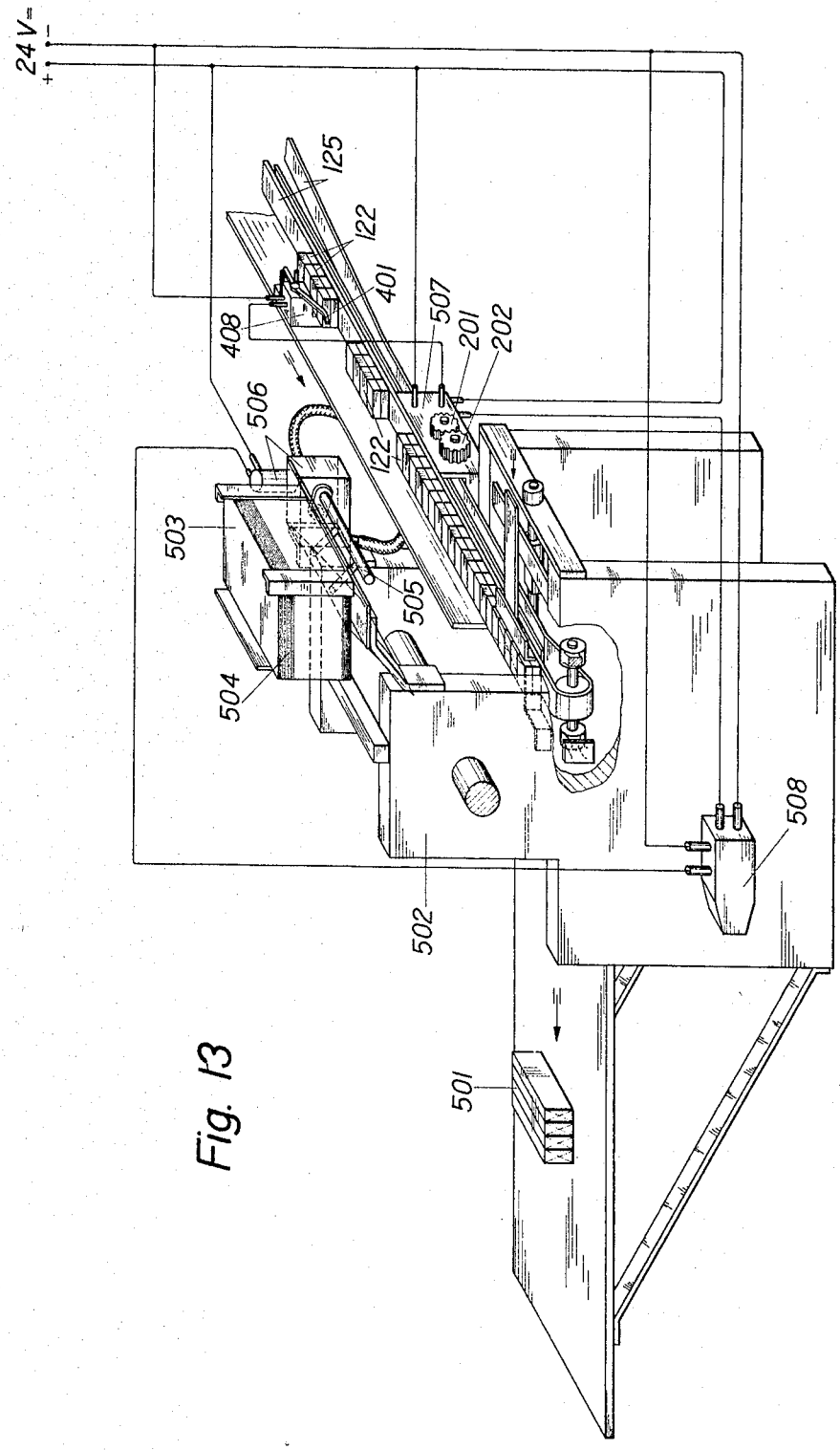
FIG. 13 is a perspective somewhat diagrammatic view of a machine for packing a plurality of packets of cigarettes in a common carton.

Referring first to FIG. 13, the packing machine illustrated comprises a conveyor belt 125 by which packets 122 of cigarettes are fed for being packed so as to form cartonlike packings 501. The packing machine has a known packing station 502 in which groups of packets 122 are packed into the form of packings 501 by use of cardboard blanks 503 which are drawn from a stack 504 of cardboard blanks in a magazine by a known suction gripper 505. An electromagnetically operable valve 506 is provided for the suction gripper 505, the valve 506 being operable at a fixed time point in the packaging cycle by a switch, so long as five packets pass under a micro-switch 408. Reference numeral 507 indicates a counting device and reference numeral 508 indicates an impulse storing device.

Figure 1:
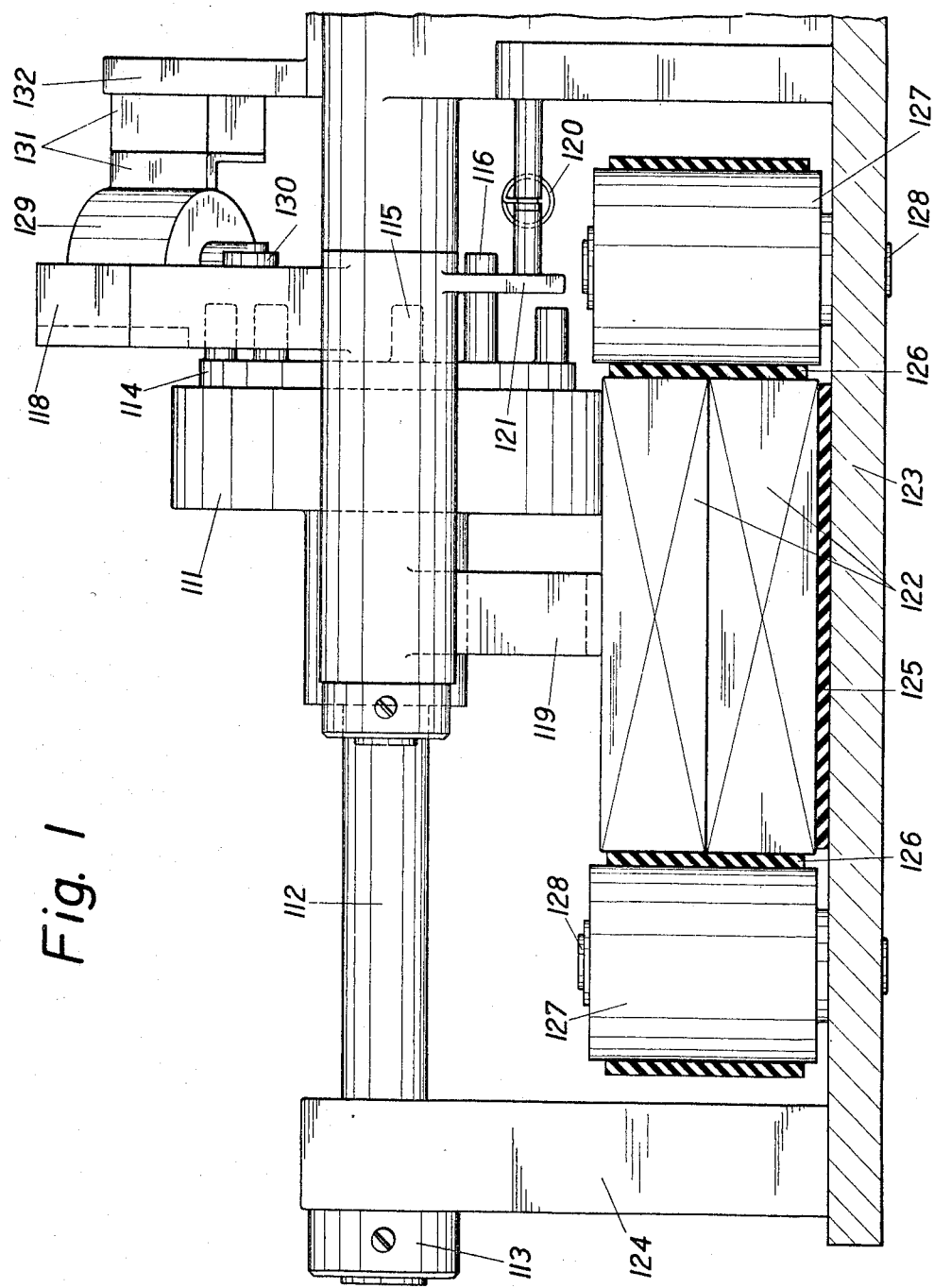
FIG. 1 is an elevation view of a counting device, which operates purely mechanically.
Figure 2:
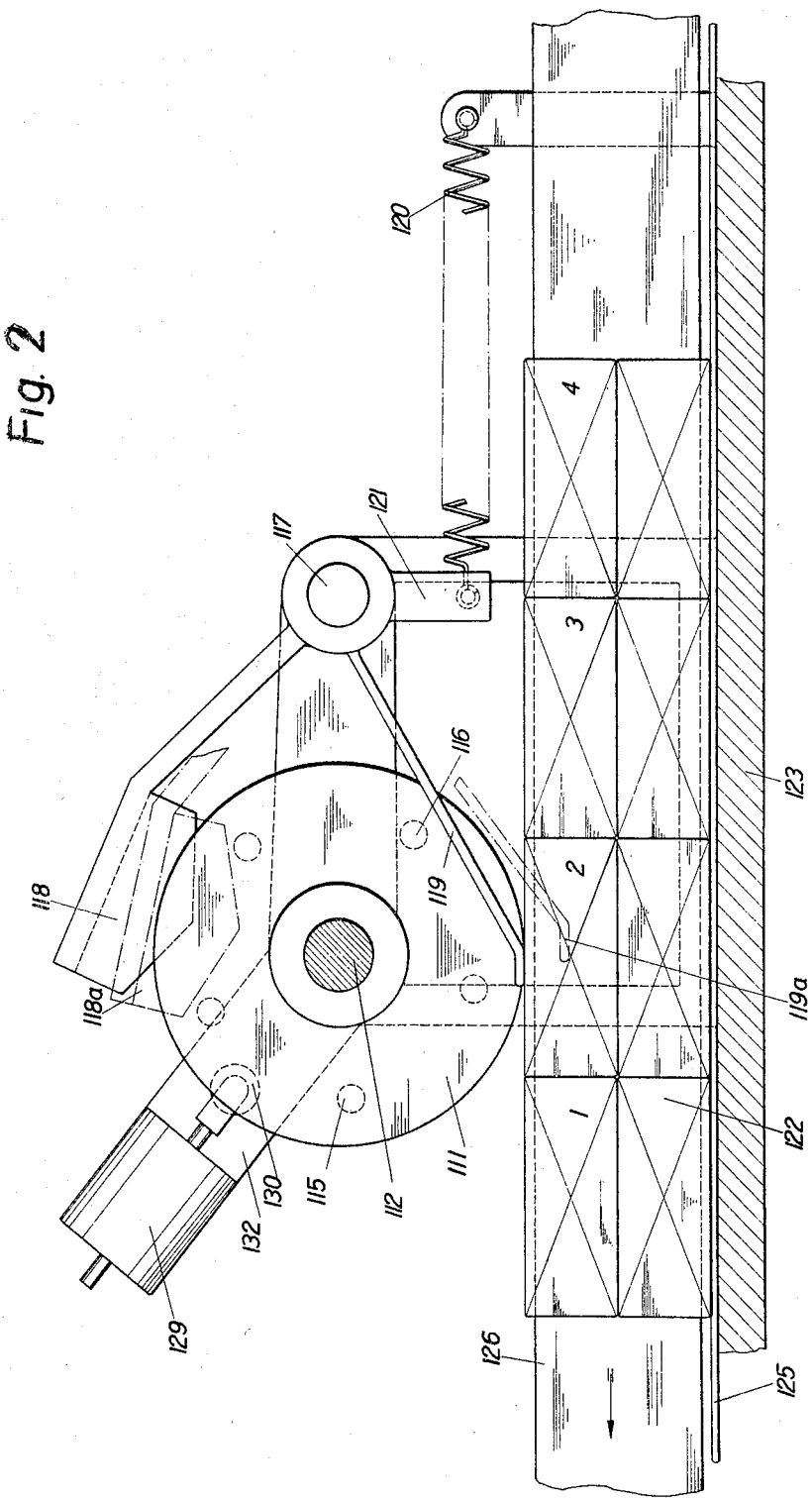
FIG. 2 is an end view of the device of FIG. 1.

A device for counting packets is shown in FIGS. 1 and 2 and comprises a roller 111 which is fixed on a shaft 112 held in bearings 124 by end collars 113. The roller 111 is disposed above a conveyor belt 125 by means of which packets 122 of cigarettes are fed. The periphery of the roller 111 is equal to the overall length of five packets 122 of cigarettes, considered in the direction of motion of the conveyor belt 125. The roller 111 is driven by contact with the packets 122 and thus rotates through one complete revolution when five packets of cigarettes have passed thereunder and in contact therewith. In actuality, the packets of cigarettes are fed by the conveyor belt 125 in such a way that in each case one packet lies above another, so that when five packets have passed directly under and in contact with the roller 111, a total of ten packets have passed, only the upper five packets having contacted the roller 111. Lateral drive belts 126 which are entrained over rollers 127 mounted on shafts 128 ensure that the packets 122 are driven below the roller 111 without slippage.

A plate 114 is fixed to the roller 111 and carries five equally spaced studs, one of which, 116 is longer than the remaining four studs 115. The stud 116 is so disposed as to engage and displace a roller 130 mounted on a rod 131, once for each revolution of the roller 111, the rod 131 operating an electric switch 129.

A sensing lever 119 is pivotally mounted on a shaft 117, the lever 119 carrying an arm 121 to which one end of a tension spring 120 is connected, the other end of the spring 120 being connected to a fixed support. The lever 119 also has an arm carrying a detent member 118 which is moveable into the position 118a shown in broken lines on movement of the sensing arm of the lever into the position 119a shown in broken lines in FIG. 2. The detent member 118 when in position 118a can engage between any successive two of the studs 115, 116, so as positively to locate the roller 111 in one of its five possible positions.

Packets 122 travelling along with the conveyor belt 125 lift the sensing lever 119 from its position 119a and thus cause the detent member 118 to release the roller 111 for rotation by the tangentially travelling packets 122.

When a gap between packets on the conveyor belt 125 reaches the roller 111, the roller is no longer driven by packets moving in contact therewith and comes to rest. At the same time, the sensing lever 119 is released so that the detent member 118 engages the roller 111 and holds it fixed in the appropriate one of its five angular positions.

After five packets 122 have passed in contact with the roller 111, whether with or without intervening gaps, the longer stud 116 on the plate 114 causes the actuation of the electric switch 129, the switching impulse thus effected being fed to an impulse storage device which will be hereinafter described.

It will be appreciated that the device of FIGS. 1 and 2 subjects the packets to a certain amount of mechanical loading. This loading is tolerable for packets which are made of cardboard but for soft packets the device of FIGS. 3, 4, 5, 9 and 10 is better suited.

As will be seen from FIGS. 9 and 10, the packets 122 are conveyed by the conveyor belt 125 which is entrained over a roller 406 and the upper transit of which passes over a support plate 123, the packets 122 being supplied to the belt 125 in known manner by a reciprocating slide 407. A sensing lever 401 is mounted on a shaft 402 above the conveyor belt 125 so as to be actuated by packets 122 passing therebelow. The lever 401 has an abutment arm 403 moveable between two stops 404 and 405. When the sensing lever 401 is raised by engagement of a packet 122 therewith, it actuates a micro-switch 408 which controls a current supply circuit for an electromagnet 215 (see FIG. 3) the purpose of which will be described further below.

Figure 3:
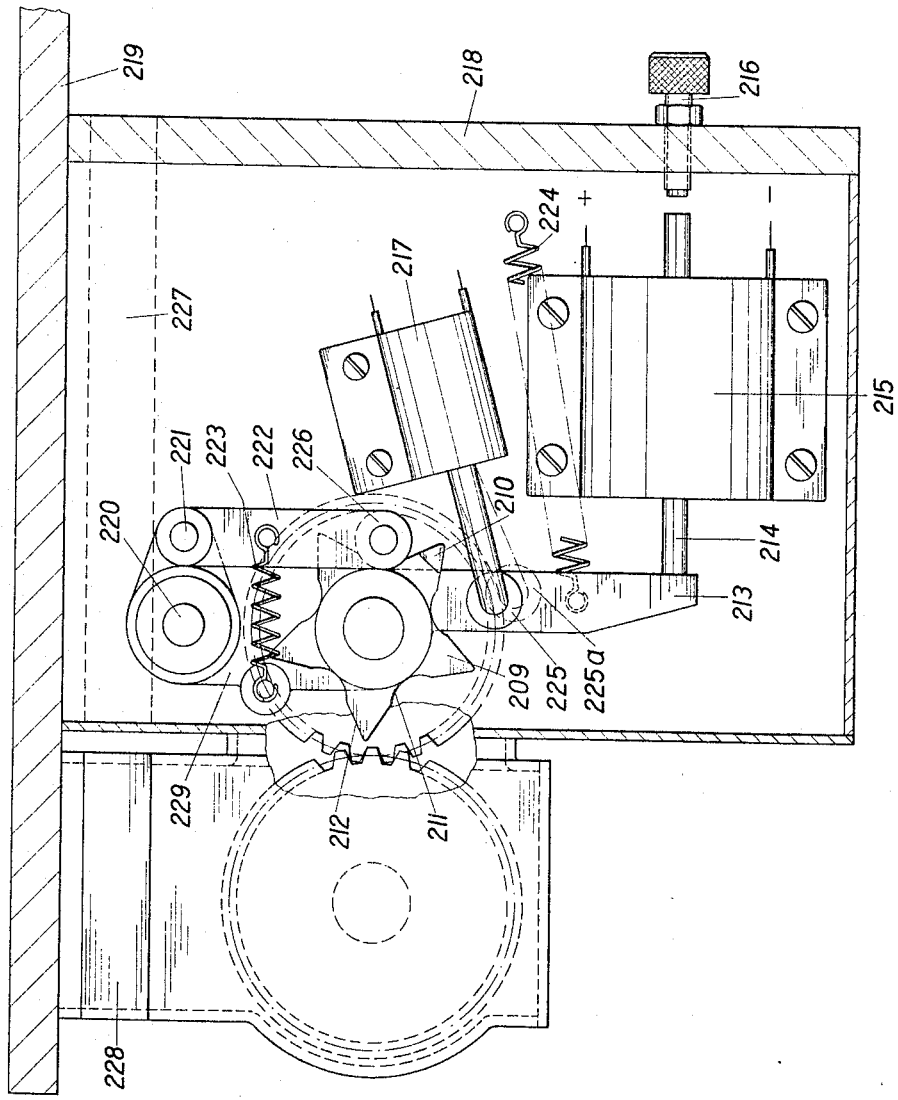
FIG. 3 is an end view of a counting device, which operates electromechanically.

The roller 202 of the device of FIGS. 3, 4 and 5 is mounted on a shaft 205 carried in a bearing 206 mounted on a plate 207 supported by brackets 228 on a main plate 219. The shaft 205 carries a spin wheel 203 which is driven by drive means (not shown) at such a speed that the peripheral speed of the roller 202 is related to the speed of the conveyor belt 125. Roller 202 drives a roller 201 by contact therewith, the circumference of the roller 201 being related to the length of five packets 122, considered in the direction of movement of the conveyor belt 125. When the roller 201 has completed one revolution, five packets on the conveyor belt 125 have passed below the roller 201 and in contact therewith.

The shaft 204 of the roller 201 is carried by a lever 229 which is mounted on a pivot 220. The lever 229 has an extension 213 which lies opposite a plunger-like armature 214 of an electromagnet 215 which is fixed to a plate 208. The stroke of the armature 214 is limited by a setting screw 216 provided in a plate 218, the lever 213 being drawn against the armature 214 by means of a tension spring 224. The lever 229 has an arm bearing a pivot 221, and by means of which a link 222 is connected to the lever 229. The link 222 carries a roller 226 which is urged into engagement with a five-pointed star wheel 209 fixed on the shaft 204, by a tension spring 223 acting on the link 222. The star wheel 209 has five semicircular recesses 211 which are continued by recess portions 212 of a larger radius than the recesses 211. As a result of the recesses 211, the roller 226 is able positively to locate the star wheel 209 in any one of five predetermined positions. A part 210 of the star wheel 209 is extended in the axial direction and acts on a roller 225, once for each revolution of the star wheel 209, in such a way that the roller 225 is moved into a position 225a shown in broken lines in FIG. 3, so as to operate a micro-switch 217 to which the roller 225 is linked.

The electromagnet 215 which, as mentioned above, is energised by actuation of the micro-switch 408 of FIG. 9, urges its armature 214 against the lever extension 213, when the electromagnet 215 is energised. This results in the roller 201 being urged against the roller 202, the roller 201 being driven by the roller 202 for the duration of energisation of the electromagnet 215. Since the energisation circuit for the electromagnet 215 is controlled by the micro-switch 408 of FIG. 9, it will be appreciated that for as long as the sensing lever 401 of FIG. 9 is held in the elevated position by packets 122 passing thereunder, the electromagnet 215 is energised and the roller 201 is driven by contact with the roller 202. This causes the star wheel 209 to be rotated through one fifth of a revolution for each packet 122 which passes below and in contact with the sensing lever 401. When five packets have passed under the sensing lever 401 and in contact therewith, the star wheel 209 has been rotated through a complete revolution and the extension 210 of the star wheel 209 causes the actuation of the micro-switch 217, which controls a current circuit to an electromagnet 312 (see FIG. 6).

Figure 6:
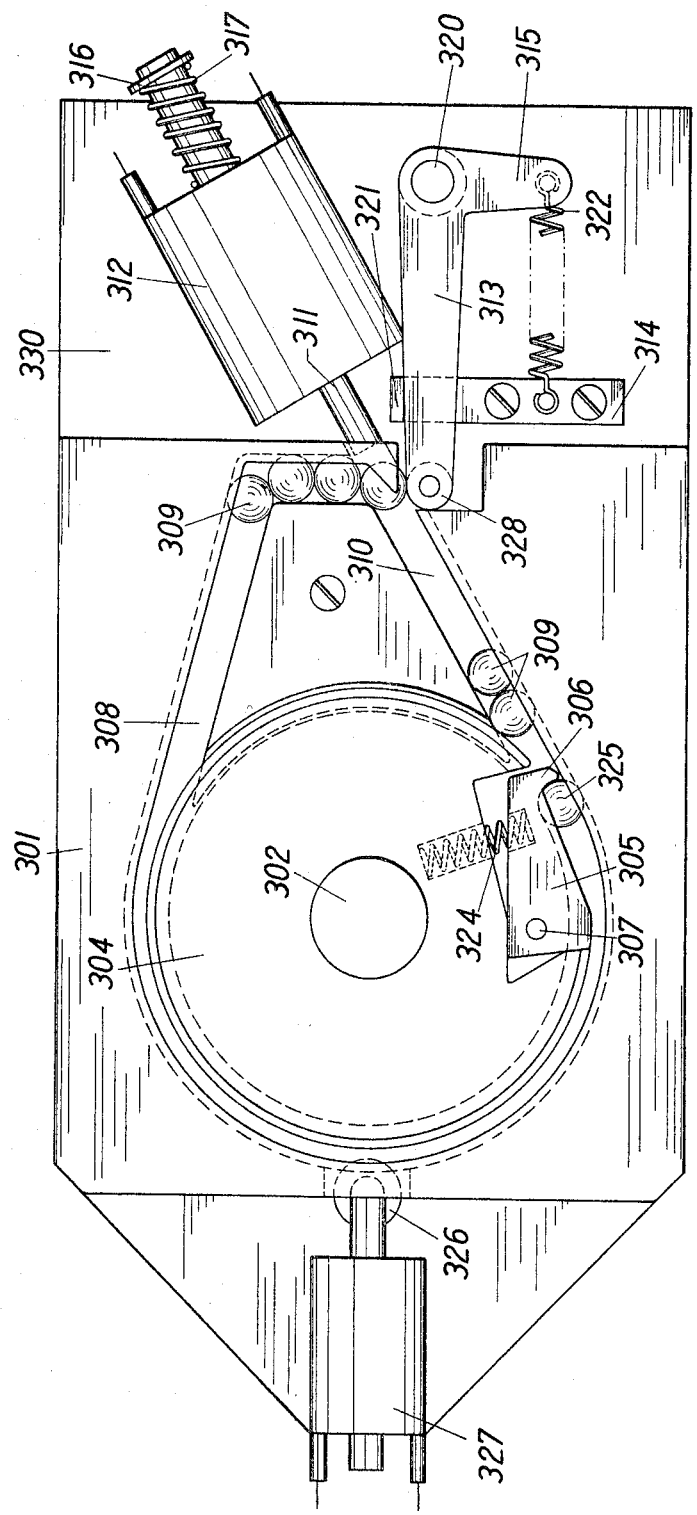
FIG. 6 is an elevation view of an impulse storage mechanism.

The electromagnet 312 forms part of an impulse storage device illustrated in FIGS. 6, 7 and 8. The storage device has a rotor 304 fixed on a shaft 302 mounted in a bearing 329. The shaft 302 is driven by drive means (not shown) in such manner that the rotor 304 is rotated through one revolution for each working cycle of the packing machine with which the arrangement is being used.

The rotor 304 has a peripheral groove and carries a pawl 305 which is mounted in a recess in the rotor 304 by means of a pivot pin 307, the pawl 305 being urged out of the rotor 304 by a compression spring 324. The rotor 304 is disposed in a housing 301 which has channels 308 and 310 which extend tangentially to and around the rotor 304 so that a closed path is formed in which hardened steel balls 309 can circulate.

A blocking lever 313, movement of which is limited in one direction by an abutment 321 is mounted on a base plate 330 by a pivot stud 320, the lever 313 being urged into engagement with the abutment 321 by a tension spring 322 which acts on an arm 315 of the lever 313. Movement of the lever 313 in the opposite direction is limited by an abutment 314. The lever 313 carries at one end a roller 328, which supports a column of balls 309, so as normally to prevent these balls 309 from passing into the channel 310 which leads to the rotor 304. The electromagnet 312 is mounted on the plate 330 in such a position that its armature 311, which is in the form of a plunger and which is biased away from the rotor 304 by a compression spring 317 acting against a collar 316 on the armature 311, extends in line with the channel 310. When the electromagnet 312 is energised, the armature 311 is urged in the direction towards the rotor 304 and pushes a ball 309 into the channel 310, the ball-supporting roller 328 of the blocking lever 313 yielding against the action of the spring 322 to allow the engaged ball 309 to pass. The balls pushed by the armature 311 thus reach a position in the channel 310 which is indicated by reference numeral 325, one ball being pushed into the channel 310 for each actuation of the micro-switch 217 of FIG. 3, and thus for each packet 122 which passes below the sensing lever 401 of FIG. 9.

For each revolution of the rotor 304, a ball if present at the position 325 is taken by the pawl 305, which has a projecting part 306 for engaging the ball, the ball being conveyed in an arcuate path by the rotor 304, and then stripped from the rotor by a stripper 331. An electric switch 327 is provided, which is operable by a push rod carrying a sensing roller 326, which projects into the ball circulation path about the rotor 304 so as to be deflected by a ball during movement of the ball by the pawl 305. Deflection of the sensing roller 326 causes operation of the switch 327. Due to the fixed position of the switch 327, and due to the fact that the rotor 304 is rotated through one revolution for each working cycle of the packing machine, the switch 327, if operated at all, will be operated at an instant of time which bears a fixed relation to the working cycle of the packing machine. Whether the switch 327 is operated or not depends on whether a ball is present at the position 325 for engagement by the pawl 305.

One ball is supplied to the position 325 for each five packets 122 which actuate the micro-switch 408 of FIG. 9. This actuation of the switch 408 may take place irregularly, depending on irregularities in the supply of packets to the conveyor belt 125. Despite such irregularities the switch 327 is actuated once for each five actuations of the switch 408, but at an instant which bears a fixed relation to the working cycle of the packing machine. The switch 327 is used for controlling a known carton-feeding device in the packing machine, for example by controlling an electromagnetically operable valve in a suction line to a carton-feeding gripper.

The electromagnet 312, the lever 313 and the abutments 314 and 321 are carried on the plate 330 which is resiliently mounted so as to provide axial alignment of the armature 311 with the channel 310. A transparent synthetic plastic cover 319 encloses the rotor 304 and the other components and protects them from dust while nevertheless allowing observation of the functioning of the device.

Figure 12:
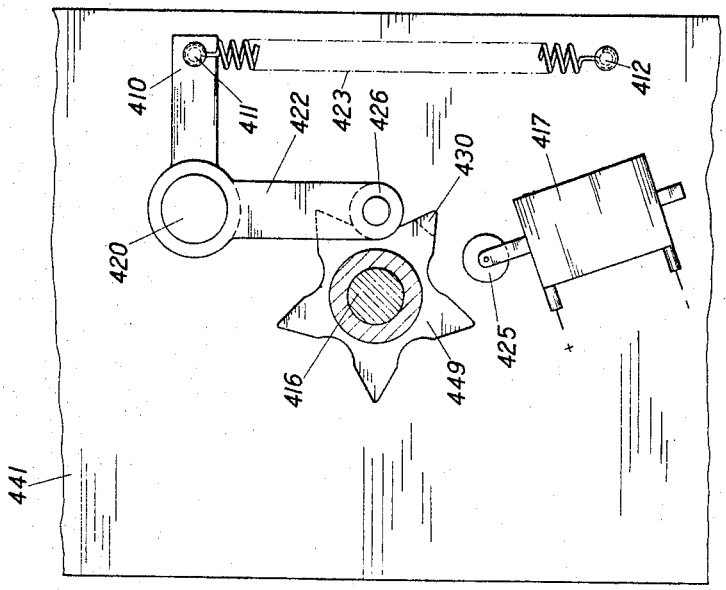
FIG. 12 is an end view of the device of FIG. 11.
Figure 11:
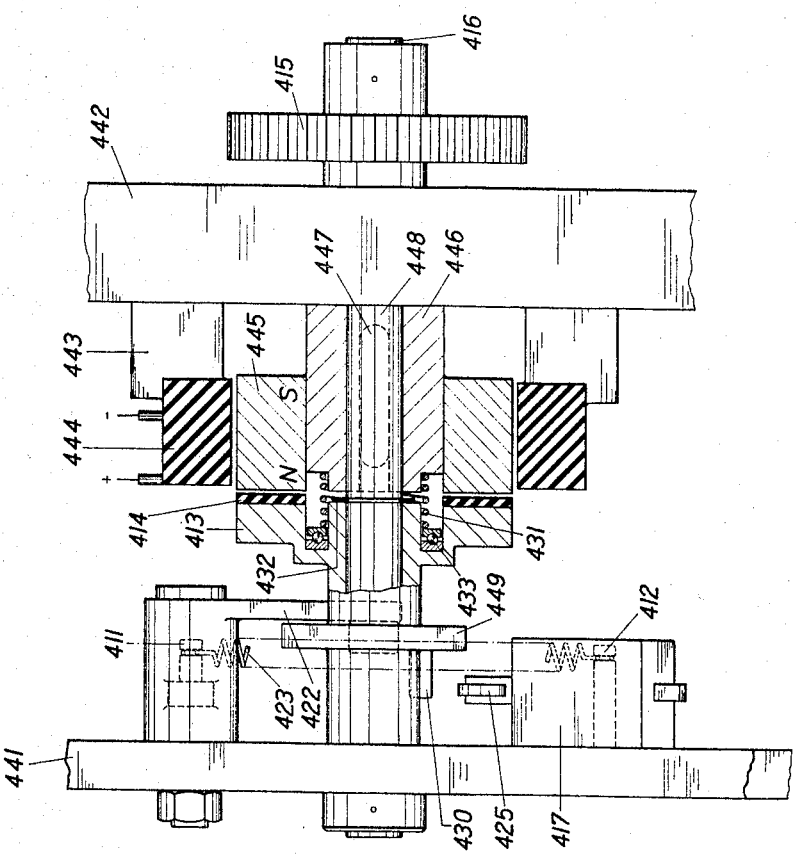
FIG. 11 is an elevation view, partly in section, of a further counting device.

Another counting device is shown in FIGS. 11 and 12 and comprises a shaft 416 mounted in plates 441 and 442 and driven by a spin wheel 415 by drive means (not shown) in such manner as to perform one revolution in the same time as the conveyor belt 125 moves through a distance equal to the length of five packets thereon.

A star wheel 449 is freely arranged on the shaft 416, the star wheel 449 having a carrier plate 413 of magnetic material with a friction layer 414 thereon. A soft iron ring 445 having a non-magnetic core 446 with a key 448 is displaceably mounted on the shaft 416, the key 448 sliding in a longitudinal keyway 447 in the shaft 416. A compression spring 431 acts between the carrier plate 413 and the core 446 to urge the core 446 and therewith the ring 445 away from the friction layer 414.

A magnet winding 444 held on a fixed support 443 on the plate 442 extends around the soft iron ring 445 with a small air gap.

The star wheel 449 is held positively located in any one of its five possible positions by a roller 426 carried on a lever 422 which is mounted on the plate 441 by a pivot pin 420. The lever 422 has an arm 410 which carries a pin 411 to which one end of a tension spring 423 is connected, the other end of the spring being connected to a fixed pin 412 on the plate 411. By the action of the spring 423, the roller 426 is held in engagement with the star wheel 449.

The star wheel 449 has a tooth 430 which is broader than its remaining four teeth, and a switch 417 having an operating roller 425 is so mounted on the plate 441 as to be actuated once for each revolution of the star wheel 449, by means of the tooth 430.

When the magnet winding 444 is energised, and for the duration of this energisation, the soft iron ring 445 is drawn magnetically into contact with the friction layer 414, against the action of the spring 431, the air gap $S_p$ between the soft iron ring 445 and the friction layer 414 being closed. The carrier plate 413 is prevented from moving axially when the winding 444 is energised by means of a retaining ring 432 on the shaft 416. The air gap is shown exaggeratedly large in FIG. 11 and may for example amount to only about 0.5 mm. Contact between the soft iron ring 445 and the friction layer 414 couples the carrier plate 413 to the shaft 416 for rotation thereby, the star wheel 449 thus being rotated for the duration of the energisation of the magnet winding 444, the lever 422 yielding against the action of the spring 423.

The winding 444 is arranged in a current circuit which is controlled by the micro-switch 408 of FIG. 9. Consequently the winding 444 is energised whenever a packet 122 is passing below the sensing lever 401 of the micro-switch 408. When five packets 122 have passed in contact with the sensing lever 401 of the micro-switch 408, the broad tooth 430 of the star wheel 449 has reached a position in which the switch 417 is operated. Switch 417 is used for controlling the energising circuit of the electromagnet 312 of FIG. 6 in a manner similar to that described for the switch 217 of FIG. 3, the device of FIGS. 11 and 12 in this case replacing the device of FIGS. 3, 4 and 5.

Referring once more to FIG. 13, it will now be seen that the valve 506 controlling the supply of carton blanks 503 from the staple 504 is operable at a fixed point in the packaging cycle by the switch 327 of FIG. 6 while five packets pass under the microswitch 408 of FIGS. 9 and 10. Furthermore, the impulse counting device 507 of FIG. 13 corresponds to the device of FIGS. 3, 4 and 5, and the impulse storing device 508 of FIG. 13 corresponds to the device of FIGS. 6, 7 and 8.

Various combinations of the above described devices are possible. For example the impulse storing device of FIGS. 6, 7 and 8 may be controlled by the counting device of FIGS. 1 and 2. Alternatively, the impulse storing device of FIGS. 6, 7 and 8 may be controlled by the counting device of FIGS. 3, 4 and 5, which in turn is controlled by the device of FIG. 9. Again, the device of FIGS. 6, 7 and 8 may be controlled by the device of FIGS. 11 and 12, which in turn is controlled by the device of FIG. 9.

It will be appreciated that in the embodiments described the counting devices generate electric impulses which, after a predetermined number of pulses, create a control effect.

It should be clearly understood that the specific embodiments described are given by way of example, and that modifications, omissions and additions are possible without departing from the spirit of this invention.

We claim:

1. In an automatic packing machine, a control arrangement comprising a conveyor path for articles, a counting device for counting articles fed along said conveyor path, an impulse storage device, means for controlling said storage device by said counting device, means for initiating a working operation of said packing machine, means for actuating said initiating means by said storage device after a predetermined number of articles fed along said conveyer path have been counted.

2. An arrangement as defined in claim 1, wherein said counting device comprises electric switch means, and a roller arranged to be driven by direct contact with the articles being fed, said roller having a periphery equal to the aggregate length of said predetermined number of articles, said length being taken in the direction of the conveyor path, said electric switch means being operable by said roller after each complete revolution thereof, said electric switch means controlling said storage device.

3. An arrangement as defined in claim 2, and further comprising a detent plate driven by said roller, a projection on said detent plate for operating said electric switch, and a detent member cooperating with said detent plate for holding said detent plate and said roller fixed in position when the roller is at rest.

4. An arrangement as defined in claim 3, and further comprising a lever carrying said detent member, said lever being engageable by the articles for releasing said roller for rotation when in engagement with the articles.

5. An arrangement as definded in claim 1, wherein the counting device comprises a rotatable drive member, a roller rotatable, at a speed related to the speed at which the articles are fed along the conveyor path, by engagement with said rotatable drive member, an electric switch device, electromagnetic means operable by said switch device for sensing the passage of the articles along the feed path for controlling said engagement, a detent member rotatable through a plurality of positions equal to said predetermined number of articles, and electric switch means operable by said detent member after each revolution thereof, said electric switch means controlling said storage device.

6. An arrangement as defined in claim 1, wherein the counting device comprises an electromagnetic clutch having an output part and an input part, said output part being, on energisation of the clutch, rotatable by said input part at a speed related to the speed at which the articles are fed along said conveyor path, a switch device for sensing the passage of the articles along said feed path, said switch device controlling the energisation of said clutch, a detent member rotatable by said clutch output part through a plurality of positions equal to said predetermined number of articles, and electric switch means operable by said detent member after each revolution thereof, said electric switch means controlling said storage device.

7. An arrangement as defined in claim 1, wherein said storage device comprises a rotor, a plurality of ball members, a housing for said rotor, said housing providing a channel for guiding said ball members, a carrier member on said rotor for engaging one ball at a time, said channel having a first portion from which balls are supplied to said rotor, one for each revolution, and a second portion into which balls are discharged by said rotor, electric switch means for controlling the release of the packing machine working cycle, said switch means being actuated by a ball when carried by said rotor between said first and second channel portions, means for normally preventing passage of balls from said first channel portion to said second channel portion, and means for overcoming the action of said passage preventing means and allowing one ball to pass from said first channel portion to said second channel portion on each actuation of said overcoming means.

8. An arrangement as defined in claim 7, wherein said passage preventing means comprise a spring loaded detent member.

9. An arrangement as defined in claim 7, wherein said overcoming means comprise an electromagnet, an armature operable by said electromagnet said armature being arranged to press a ball past said passage preventing means on each energisation of said electromagnet, said electromagnet being arranged for energisation by said electric switch means of said counting device.

References Cited by the Examiner
UNITED STATES PATENTS
3,102,374   9/1963   Lloyd et al. _____ 53—78

ANDRES H. NIELSEN, *Primary Examiner.*
RICHARD E. AEGERTER, *Examiner.*